United States Patent
Yu et al.

(10) Patent No.: US 12,488,166 B2
(45) Date of Patent: Dec. 2, 2025

(54) IMPLEMENTING BURST TRANSFERS FOR PREDICATED MEMORY ACCESSES IN LOOP BODIES FOR HIGH-LEVEL SYNTHESIS

(71) Applicant: Xilinx, Inc., San Jose, CA (US)

(72) Inventors: Lin-Ya Yu, San Jose, CA (US); Alexandre Isoard, San Jose, CA (US); Hem C. Neema, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 515 days.

(21) Appl. No.: 18/059,348

(22) Filed: Nov. 28, 2022

(65) Prior Publication Data
US 2024/0176936 A1    May 30, 2024

(51) Int. Cl.
*G06F 30/327* (2020.01)
*G06F 30/323* (2020.01)
*G06F 30/337* (2020.01)
*G06F 30/373* (2020.01)
*G06F 30/398* (2020.01)

(52) U.S. Cl.
CPC .......... *G06F 30/327* (2020.01); *G06F 30/323* (2020.01); *G06F 30/337* (2020.01); *G06F 30/373* (2020.01); *G06F 30/398* (2020.01)

(58) Field of Classification Search
CPC .... G06F 30/327; G06F 30/323; G06F 30/337; G06F 30/373; G06F 30/398
USPC .................... 716/103, 104, 132, 136; 703/14
See application file for complete search history.

(56) References Cited

U.S. PATENT DOCUMENTS

| | | | |
|---|---|---|---|
| 8,516,468 B2 * | 8/2013 | Ng | G06F 8/452 717/160 |
| 9,430,203 B2 * | 8/2016 | Ishii | G06F 8/4441 |
| 10,331,836 B1 * | 6/2019 | Hosangadi | G06F 30/30 |
| 11,762,762 B1 * | 9/2023 | Yu | G06F 8/40 717/169 |
| 2002/0103959 A1 | 8/2002 | Baker, Jr. | |
| 2005/0193359 A1 | 9/2005 | Gupta | |
| 2007/0162900 A1 | 7/2007 | Biswas | |
| 2008/0208560 A1 | 8/2008 | Johnson | |

(Continued)

OTHER PUBLICATIONS

Intel, Intel® FPGA SDK for OpenCL™ Pro Edition, Best Practices Guide, Updated for Intel® Quartus® Prime Design Suite: 21.3, ID: 683521, Version: Oct. 4, 2021, 7 pages.

(Continued)

*Primary Examiner* — Phallaka Kik
(74) *Attorney, Agent, or Firm* — Kevin T. Cuenot

(57) ABSTRACT

Implementing burst transfers for predicated accesses in high-level synthesis includes generating, using computer hardware, an intermediate representation of a design specified in a high-level programming language. The design is for an integrated circuit. Using the computer hardware, loop predicate information for one or more conditional statements within a loop body of the intermediate representation is determined. A plurality of memory accesses of the loop body guarded by the one or more conditional statements are determined to be sequential memory accesses based on the predicate information. The intermediate representation is modified by inserting one or more intrinsics therein indicating that the sequential memory accesses are to be implemented using a burst transfer mode of the integrated circuit.

20 Claims, 13 Drawing Sheets

(56) References Cited

U.S. PATENT DOCUMENTS

| | | | |
|---|---|---|---|
| 2012/0204163 A1* | 8/2012 | Marathe | G06F 8/4442 |
| | | | 717/151 |
| 2014/0215183 A1 | 7/2014 | Yazdani | |
| 2015/0106596 A1* | 4/2015 | Vorbach | G06F 9/3877 |
| | | | 712/221 |
| 2015/0277874 A1* | 10/2015 | Haraguchi | G06F 8/443 |
| | | | 717/160 |
| 2016/0011870 A1* | 1/2016 | Plotnikov | G06F 9/30032 |
| | | | 712/205 |
| 2019/0079738 A1* | 3/2019 | Samuel | G06F 8/35 |
| 2019/0278593 A1* | 9/2019 | Elango | G06F 9/30065 |
| 2020/0364052 A1* | 11/2020 | Chinchole | G06F 8/4441 |
| 2021/0255891 A1* | 8/2021 | Henretty | G06F 8/45 |
| 2023/0058355 A1* | 2/2023 | Hornung | G06F 9/3889 |
| 2024/0020239 A1* | 1/2024 | Boonstra | G06F 7/5443 |

OTHER PUBLICATIONS

Richard Johnson, et al., The Program Structure Tree: Computing Control Regions in Linear Time, Department of Computer Science Cornell University, Ithaca, NY 14853, 15 pages.

Jussi Vanhatalo, et al., The Refined Process Structure Tree, IBM Zurich Research Laboratory, Säumerstrasse 4, CH-8803 Rüschlikon, Switzerland, Institute of Architecture of Application Systems, University of Stuttgart, Universitatsstrasse 38, D-70569 Stuttgart, Germany, Jan. 16, 2009, 53 pages.

The LLVM Compiler Infrastructure, 2019 European LLVM Developers Meeeting, Apr. 8-9, 2019, 28 pages, https://llvm.org/devmtg/2019-04/talks.html.

Djoudi et al., "MAQAO: Modular Assembler Quality Analyzer and Optimizer for Itanium 2" (Year: 2005).

A Akoglu, "Application Specific Reconfigurable Architecture Design Methodology" (Year: 2005).

\* cited by examiner

102

```
1   constexpr uint64_t N = 50;
2
3   extern "C" void example(int a[N], int b[N], int m) {
4   #pragma HLS INTERFACE m_axi port = a bundle=gmem depth = N
5   #pragma HLS INTERFACE m_axi port = b bundle=gmem depth = N
6           int buff[N];
7
8           for (int i = 0; i < 2 * N; i++) {
9                   if (i <= 40 /*range predicate*/ || m > 7 /*loop invariant predicate*/)
10                          continue;
11                  if (i % 2 == 0 /*stride predicate*/) {
12                          // When not(i <= 40 || m > 7) && (i % 2 == 0),
13                          // below code in the region would be executed.
14                          // not(i <= 40 || m > 7) && (i % 2 == 0) is equivalent to
15                          // (i > 40) && (m <= 7) && (i % 2 == 0)
16                          buff[i/2] = a[i/2];
17                          buff[i/2] = buff[i/2] + 100;
18                          b[i/2] = buff[i/2];
19                  }
20          }
21  }
```

FIG. 2

```
1   define void @example(i32* noalias nocapture nonnull readonly                         106
2   "fpga.caller.interfaces"="m_axi" "fpga.decayed.dim.hint"="50"
3   "m_axi.bundle.name"="gmem" %a, i32* noalias nocapture nonnull
4   "fpga.caller.interfaces"="m_axi" "fpga.decayed.dim.hint"="50"
5   "m_axi.bundle.name"="gmem" %b, i32 %m) local_unnamed_addr #0 {
6   entry:
7           call void @llvm.sideeffect() #3 [ "xlx_s_axilite"(i32* %a, [7 x i8] c"control", i64 -1, i1 false, [0 x
8   i8] zeroinitializer, [0 x i8] zeroinitializer, [0 x i8] zeroinitializer) ]
9           call void @llvm.sideeffect() #4 [ "xlx_m_axi"(i32* %a, [4 x i8] c"gmem", i64 50, [5 x i8]
10  c"slave", [0 x i8] zeroinitializer, i64 16, i64 16, i64 16, i64 16, i64 0, i64 0, i32 0) ]
11          call void @llvm.sideeffect() #3 [ "xlx_s_axilite"(i32* %b, [7 x i8] c"control", i64 -1, i1 false, [0 x
12  i8] zeroinitializer, [0 x i8] zeroinitializer, [0 x i8] zeroinitializer) ]
13          call void @llvm.sideeffect() #4 [ "xlx_m_axi"(i32* %b, [4 x i8] c"gmem", i64 50, [5 x i8]
14  c"slave", [0 x i8] zeroinitializer, i64 16, i64 16, i64 16, i64 16, i64 0, i64 0, i32 0) ]
15          %cmp2 = icmp sgt i32 %m, 7
16          br label %for.body
17  for.body:             ; preds = %for.inc, %entry
18          %indvars.iv = phi i64 [ 0, %entry ], [ %indvars.iv.next, %for.inc ]
19          %cmp1 = icmp sle i64 %indvars.iv, 40
20          %brmerge = or i1 %cmp1, %cmp2
21          br i1 %brmerge, label %for.inc, label %if.end
22
23  if.end:               ; preds = %for.body
24          %0 = trunc i64 %indvars.iv to i32
25          %rem2 = urem i32 %0, 2
26          %cmp3 = icmp eq i32 0, %rem2
27          br i1 %cmp3, label %if.then4, label %if.end20
28
29  if.then4:             ; preds = %if.end
30          %div3 = udiv i32 %0, 2
31          %idxprom = sext i32 %div3 to i64
32          %arrayidx = getelementptr inbounds i32, i32* %a, i64 %idxprom
33          %1 = load i32, i32* %arrayidx, align 4
34          %add = add nsw i32 %1, 100
35          %arrayidx19 = getelementptr inbounds i32, i32* %b, i64 %idxprom
36          store i32 %add, i32* %arrayidx19, align 4
37          br label %if.end20
38
39  if.end20:             ; preds = %if.then4, %if.end
40          br label %for.inc
41
42  for.inc:              ; preds = %if.end20, %for.body
43          %indvars.iv.next = add nuw nsw i64 %indvars.iv, 1
44          %exitcond = icmp ne i64 %indvars.iv.next, 100
45          br i1 %exitcond, label %for.body, label %for.end, !llvm.loop !5
46
47  for.end:              ; preds = %for.inc
48          ret void
49  }
```

FIG. 3

```
1   define void @example(i32* noalias nocapture nonnull readonly "fpga.caller.interfaces"="m_axi"
2   "fpga.decayed.dim.hint"="50"
3   "m_axi.bundle.name"="gmem" %a, i32* noalias nocapture nonnull "fpga.caller.interfaces"="m_axi"
4   "fpga.decayed.dim.hint"="50"
5   "m_axi.bundle.name"="gmem" %b, i32 %m) local_unnamed_addr #0 {
6   entry:
7           call void @llvm.sideeffect() #3 [ "xlx_s_axilite"(i32* %a, [7 x i8] c"control", i64 -1, i1 false, [0 x
8   i8] zeroinitializer, [0 x i8] zeroinitializer, [0 x i8] zeroinitializer) ]
9           call void @llvm.sideeffect() #4 [ "xlx_m_axi"(i32* %a, [4 x i8] c"gmem", i64 50, [5 x i8]
10  c"slave", [0 x i8] zeroinitializer, i64 16, i64 16, i64 16, i64 16, i64 0, i64 0, i32 0) ]
11          call void @llvm.sideeffect() #3 [ "xlx_s_axilite"(i32* %b, [7 x i8] c"control", i64 -1, i1 false, [0 x
12  i8] zeroinitializer, [0 x i8] zeroinitializer, [0 x i8] zeroinitializer) ]
13          call void @llvm.sideeffect() #4 [ "xlx_m_axi"(i32* %b, [4 x i8] c"gmem", i64 50, [5 x i8]
14  c"slave", [0 x i8] zeroinitializer, i64 16, i64 16, i64 16, i64 16, i64 0, i64 0, i32 0) ]
15          %cmp2 = icmp sgt i32 %m, 7
16          br label %for.body
17
18  for.body:              ; preds = %for.inc, %entry
19  ;          loop<%for.body> at depth 1 with exact backedge-taken count of 99
20  ;          IndVar interval: [0,100)
21          %indvars.iv = phi i64 [ 0, %entry ], [ %indvars.iv.next, %for.inc ]
22          %cmp1 = icmp sle i64 %indvars.iv, 40
23          %brmerge = or i1 %cmp1, %cmp2
24          br i1 %brmerge, label %for.inc, label %if.end
25
26  if.end:                ; preds = %for.body
27  ;          loop<%for.body> at depth 1 with exact backedge-taken count of 99
28  ;          IndVar interval: [41,100)
29  ;          && predicates:
30  ;          not     %cmp1 = icmp sle i64 %indvars.iv, 40
31  ;          not     %cmp2 = icmp sgt i32 %m, 7 ---> loop invariant
32          %0 = trunc i64 %indvars.iv to i32
33          %rem2 = urem i32 %0, 2
34          %cmp3 = icmp eq i32 0, %rem2
35          br i1 %cmp3, label %if.then4, label %if.end20
```

FIG. 4A

```
36    if.then4:; preds = %if.end
37    ;       loop<%for.body> at depth 1 with exact backedge-taken count of 99
38    ;       IndVar interval: [42,100)
39    ;       && predicates:
40    ;       %cmp3 = icmp eq i32 %rem2, 0
41    ;       not    %cmp1 = icmp sle i64 %indvars.iv, 40
42    ;       not    %cmp2 = icmp sgt i32 %m, 7 ---> loop invariant
43            %div3 = udiv i32 %0, 2
44            %idxprom = sext i32 %div3 to i64
45            %arrayidx = getelementptr inbounds i32, i32* %a, i64 %idxprom
46            %1 = load i32, i32* %arrayidx, align 4
47            %add = add nsw i32 %1, 100
48            %arrayidx19 = getelementptr inbounds i32, i32* %b, i64 %idxprom
49            store i32 %add, i32* %arrayidx19, align 4
50            br label %if.end20
51
52    if.end20:       ; preds = %if.then4, %if.end
53    ;       loop<%for.body> at depth 1 with exact backedge-taken count of 99
54    ;       IndVar interval: [41,100)
55    ;       && predicates:
56    ;       not %cmp1 = icmp sle i64 %indvars.iv, 40
57    ;       not %cmp2 = icmp sgt i32 %m, 7 ---> loop invariant
58            br label %for.inc
59
60    for.inc:  ; preds = %if.end20, %for.body
61    ;       loop<%for.body> at depth 1 with exact backedge-taken count of 99
62    ;       IndVar interval: [0,100)
63            %indvars.iv.next = add nuw nsw i64 %indvars.iv, 1
64            %exitcond = icmp ne i64 %indvars.iv.next, 100
65            br i1 %exitcond, label %for.body, label %for.end, !llvm.loop !5
66
67    for.end:        ; preds = %for.inc
68            ret void
69    }
```

FIG. 4B

```
1   define void @example(i32* noalias nocapture nonnull readonly "fpga.caller.interfaces"="m_axi"
2   "fpga.decayed.dim.hint"="50" "m_axi.bundle.name"="gmem" %a, i32* noalias nocapture nonnull
3   "fpga.caller.interfaces"="m_axi" "fpga.decayed.dim.hint"="50" "m_axi.bundle.name"="gmem" %b, i32
4   %m) local_unnamed_addr #0 {
5   entry:
6           call void @llvm.sideeffect() #3 [ "xlx_s_axilite"(i32* %a, [7 x i8] c"control", i64 -1, i1 false, [0 x
7   i8] zeroinitializer, [0 x i8] zeroinitializer, [0 x i8] zeroinitializer) ]
8           call void @llvm.sideeffect() #4 [ "xlx_m_axi"(i32* %a, [4 x i8] c"gmem", i64 50, [5 x i8]
9   c"slave", [0 x i8] zeroinitializer, i64 16, i64 16, i64 16, i64 16, i64 0, i64 0, i32 0) ]
10          call void @llvm.sideeffect() #3 [ "xlx_s_axilite"(i32* %b, [7 x i8] c"control", i64 -1, i1 false, [0 x
11  i8] zeroinitializer, [0 x i8] zeroinitializer, [0 x i8] zeroinitializer) ]
12          call void @llvm.sideeffect() #4 [ "xlx_m_axi"(i32* %b, [4 x i8] c"gmem", i64 50, [5 x i8]
13  c"slave", [0 x i8] zeroinitializer, i64 16, i64 16, i64 16, i64 16, i64 0, i64 0, i32 0) ]
14          %cmp2 = icmp sgt i32 %m, 7
15          br label %for.body
16
17  for.body:                    ; preds = %for.inc, %entry
18          %indvars.iv = phi i64 [ 0, %entry ], [ %indvars.iv.next, %for.inc ]
19          %cmp1 = icmp sle i64 %indvars.iv, 40
20          %brmerge = or i1 %cmp1, %cmp2
21          br i1 %brmerge, label %for.inc, label %if.end
22
23  if.end:                      ; preds = %for.body
24          %0 = trunc i64 %indvars.iv to i32
25          %rem2 = urem i32 %0, 2
26          %cmp3 = icmp eq i32 %rem2, 0
27          br i1 %cmp3, label %if.then4, label %if.end20
28
29  if.then4:                    ; preds = %if.end
30          %div3 = udiv i32 %0, 2
31          %idxprom = sext i32 %div3 to i64
32          %arrayidx = getelementptr inbounds i32, i32* %a, i64 %idxprom
33  ;       Sequential access region: loop<%for.body> at depth 1
34  ;       Under predicates:
35  ;       not %cmp2 = icmp sgt i32 %m, 7
36  ;       Sequential loads on `a` starts at (84 + %a)<nsw> with length of 29
37          %1 = load i32, i32* %arrayidx, align 4
38          %add = add nsw i32 %1, 100
39          %arrayidx19 = getelementptr inbounds i32, i32* %b, i64 %idxprom
40  ;       Sequential access region: loop<%for.body> at depth 1
41  ;       Under predicates:
42  ;       not %cmp2 = icmp sgt i32 %m, 7
43  ;       Sequential stores on `b` starts at (84 + %b)<nsw> with length of 29
44          store i32 %add, i32* %arrayidx19, align 4
45          br label %if.end20
```

FIG. 5A

```
46  if.end20:              ; preds = %if.then4,
47  %if.end
48          br label %for.inc
49
50  for.inc:               ; preds = %if.end20,
51  %for.body
52          %indvars.iv.next = add nuw nsw i64 %indvars.iv, 1
53          %exitcond = icmp ne i64 %indvars.iv.next, 100
54          br i1 %exitcond, label %for.body, label %for.end, !llvm.loop !5
55
56  for.end:               ; preds = %for.inc
57          ret void
58  }
```

```
1   define void @example(i32* noalias nocapture nonnull readonly "fpga.caller.interfaces"="m_axi"
2   "fpga.decayed.dim.hint"="50"
3   "m_axi.bundle.name"="gmem" %a, i32* noalias nocapture nonnull "fpga.caller.interfaces"="m_axi"
4   "fpga.decayed.dim.hint"="50" "m_axi.bundle.name"="gmem" %b, i32 %m) local_unnamed_addr #0 {
5   entry:
6           call void @llvm.sideeffect() #4 [ "xlx_s_axilite"(i32* %a, [7 x i8] c"control", i64 -1, i1 false, [0 x
7   i8] zeroinitializer, [0 x i8] zeroinitializer, [0 x i8] zeroinitializer) ]
8           call void @llvm.sideeffect() #5 [ "xlx_m_axi"(i32* %a, [4 x i8] c"gmem", i64 50, [5 x i8]
9   c"slave", [0 x i8] zeroinitializer, i64 16, i64 16, i64 16, i64 16, i64 0, i64 0, i32 0) ]
10          call void @llvm.sideeffect() #4 [ "xlx_s_axilite"(i32* %b, [7 x i8] c"control", i64 -1, i1 false, [0 x
11  i8] zeroinitializer, [0 x i8] zeroinitializer, [0 x i8] zeroinitializer) ]
12          call void @llvm.sideeffect() #5 [ "xlx_m_axi"(i32* %b, [4 x i8] c"gmem", i64 50, [5 x i8]
13  c"slave", [0 x i8] zeroinitializer, i64 16, i64 16, i64 16, i64 16, i64 0, i64 0, i32 0) ]
14          %cmp2 = icmp sgt i32 %m, 7
15          %0 = icmp sle i32 %m, 7
16          %scevgep = getelementptr inbounds i32, i32* %a, i64 21
17          %1 = select i1 %0, i64 29, i64 0
18          %scevgepseq = call i32* @llvm.fpga.seq.load.begin.p0i32.i64(i32* %scevgep, i64 %1)
19          %scevgep1 = getelementptr inbounds i32, i32* %b, i64 21
20          %scevgep1seq = call i32* @llvm.fpga.seq.store.begin.p0i32.i64(i32*
21          %scevgep1, i64 %1) br label %for.body
22
23  for.body:                      ; preds = %for.inc, %entry
24          %indvars.iv = phi i64 [ 0, %entry ], [ %indvars.iv.next, %for.inc ]
25          %2   =    lshr i64 %indvars.iv, 1
26          %3   =    shl i64 %2, 2
27          %4   =    add i64 %3, -84
28          %5   =    lshr i64 %4, 2
29          %cmp1 = icmp sle i64 %indvars.iv, 40
30          %brmerge = or i1 %cmp1, %cmp2
31          br i1 %brmerge, label %for.inc, label %if.end
32
33  if.end:                        ; preds = %for.body
34          %6 = trunc i64 %indvars.iv to i32
35          %rem2 = urem i32 %6, 2
36          %cmp3 = icmp eq i32 %rem2, 0
37          br i1 %cmp3, label %if.then4, label %if.end20
38
39          if.then4:              ; preds = %if.end
40          %7 = call i32 @llvm.fpga.seq.load.i32.p0i32.i64(i32* %scevgepseq, i64 %5)
41          %add = add nsw i32 %7, 100
42          call void @llvm.fpga.seq.store.i32.p0i32.i64.i4(i32 %add, i32* %scevgep1seq, i64 %5, i4 -1)
43          br label %if.end20
```

```
44   if.end20:              ; preds = %if.then4,
45   %if.end
46         br label %for.inc
47
48   for.inc:              ; preds = %if.end20,
49   %for.body
50         %indvars.iv.next = add nuw nsw i64 %indvars.iv, 1
51         %exitcond = icmp ne i64 %indvars.iv.next, 100
52         br i1 %exitcond, label %for.body, label %for.end, !llvm.loop !5
53
54   for.end:              ; preds = %for.inc
55         call void @llvm.fpga.seq.load.end.p0i32.i64(i32* %scevgepseq, i64 %1)
56         call void @llvm.fpga.seq.store.end.p0i32.i64(i32* %scevgep1seq, i64 %1)
57         ret void
58   }
```

┌─────────────────────────────────────────┐
│ Generate load/store candidate lists and may-load/may-store candidate lists
│ 802 │
└─────────────────────────────────────────┘
                    │
┌─────────────────────────────────────────┐
│ Check each memory access in the candidate lists to determine whether the memory access is under a supported predicate
│ 804 │
└─────────────────────────────────────────┘
                    │
┌─────────────────────────────────────────┐
│ Determine consecutiveness of the candidate accesses over the loop
│ 806 │
└─────────────────────────────────────────┘
                    │
┌─────────────────────────────────────────┐
│ Determine whether any side effect instructions are in the loop body that block the burst transformation correctness
│ 808 │
└─────────────────────────────────────────┘
                    │
┌─────────────────────────────────────────┐
│ Determine length of detected consecutive memory accesses greater than 1
│ 810 │
└─────────────────────────────────────────┘
                    │
┌─────────────────────────────────────────┐
│ In response to determining that the length is greater than 1, record sequential access chain information by creating and/or updating sequential access object and recording which region the sequential access object lives within the sequential access information object
│ 812 │
└─────────────────────────────────────────┘

Obtain sequential access information from sequential
access analyzer
902

Determine whether each sequential access chain is
associated with an interface of the target hardware that
supports burst transfer optimizations
904

Transform sequential access pattern of IR to generate
modified IR including burst transfer intrinsics
906

FIG. 9

IMPLEMENTING BURST TRANSFERS FOR PREDICATED MEMORY ACCESSES IN LOOP BODIES FOR HIGH-LEVEL SYNTHESIS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to high-level synthesis of designs for integrated circuits and, more particularly, to implementing burst transfers for the designs.

BACKGROUND

High-Level Synthesis (HLS) refers to a technology that converts a design specified in a high-level programming language into a circuit design specified in a hardware description language. The circuit design may then be realized, i.e., physically implemented, within an integrated circuit (IC). The quality of implementation of the circuit design within the IC often depends on the ability of the implementation tools to recognize particular characteristics in the high-level programming language source code of the design that are transformed into particular features available in the target hardware (e.g., the IC in which the design is to be physically realized).

For example, most hardware supports a data transfer mode referred to as "burst transfer mode." In general, burst transfer mode is a temporary high-speed data transmission mode used to facilitate sequential data transfer at maximum throughput. Burst transfer mode aggregates sequential memory accesses and processes the memory accesses without implementing all the steps that a memory access would require for each individual memory access that is aggregated. This improves the hardware performance when communicating with a memory subsystem. Depending on the particular hardware implementation, data transfer speeds using burst transfer mode are often two to five times faster than normal transmission protocols. This means that effective utilization of burst transfer mode when implementing a design in an IC may significantly improve throughput of the resulting hardware. Current Electronic Design Automation (EDA) tools that perform HLS, however, are limited in their ability to recognize opportunities in the source code of a design for applying burst transfer mode.

SUMMARY

In one or more example implementations, a method includes generating, using computer hardware, an intermediate representation of a design specified in a high-level programming language. The design is for an integrated circuit. The method includes, using the computer hardware, determining loop predicate information for one or more conditional statements within a loop body of the intermediate representation. The method includes determining, using the computer hardware, that a plurality of memory accesses of the loop body guarded by the one or more conditional statements are sequential memory accesses that execute in different iterations of the loop body based on the predicate information. The method includes modifying the intermediate representation by inserting one or more intrinsics therein indicating that the sequential memory accesses are to be implemented using a burst transfer mode of the integrated circuit.

The foregoing and other implementations can each optionally include one or more of the following features, alone or in combination. Some example implementations include all the following features in combination.

In some aspects, the method includes detecting basic blocks within the intermediate representation.

In some aspects, the method includes generating a hardware description language version of the design from the intermediate representation, as modified. The sequential memory accesses are designated for implementation in the integrated circuit using the burst transfer mode.

In some aspects, the one or more conditional statements include a loop invariant predicate.

In some aspects, the one or more conditional statements include a range predicate.

In some aspects, the one or more conditional statements include a stride predicate.

In some aspects, the method includes generating sequential access chain information specifying a plurality of sequential memory accesses supported by selected predicate types. The sequential access chain information can include a start access address, an access length, a list of the sequential memory accesses, and one or more predicates of the selected predicate types that guard the sequential memory accesses.

In one or more example implementations, a system includes one or more processors configured to initiate and/or execute the various operations described within this disclosure.

In one or more example implementations, a computer program product includes one or more computer readable storage mediums having program instructions embodied therewith. The program instructions are executable by computer hardware to cause the computer hardware to initiate and/or execute the various operations described within this disclosure.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates example source code processed by the EDA system of FIG. 1.

FIG. 3 illustrates an example of the intermediate representation (IR) as generated from the example source code of FIG. 2.

FIGS. 4A and 4B, taken collectively, illustrate an example of loop predicate information generated by the loop predicate analyzer of FIG. 1.

FIGS. 5A and 5B, taken collectively, illustrate an example of sequential access information generated by the sequential access analyzer of FIG. 1.

FIGS. 6A and 6B, taken collectively, illustrate an example of modified IR generated by the sequential access transformer of FIG. 1.

FIG. 8 illustrates an example method for performing sequential access analysis as performed by the sequential access analyzer of FIG. 1.

FIG. 9 illustrates an example method for performing sequential access transformation as performed by the sequential access transformer of FIG. 1.

DETAILED DESCRIPTION

Figure 1:
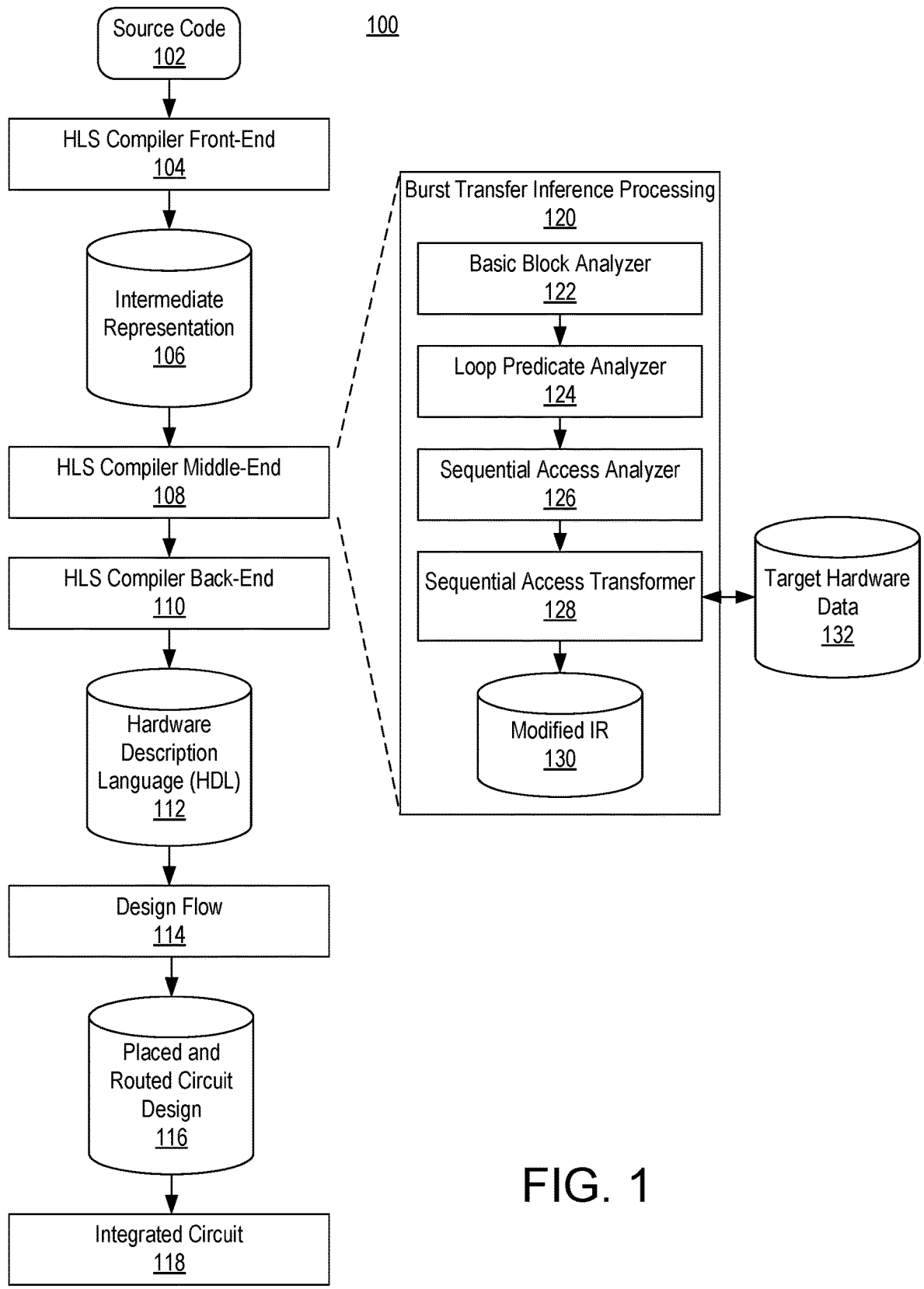
FIG. 1 illustrates an example flow performed by an Electronic Design Automation (EDA) system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to implementing burst transfers for high-level synthesis of designs for ICs. In accordance with the inventive arrangements described within this disclosure, methods, systems, and computer program products are provided for high-level synthesis (HLS) that facilitate implementation of burst transfers (e.g., burst transfer mode) for predicated memory accesses disposed in loop bodies of a design. Conventional HLS systems are unable to process loop constructs that include predicated memory accesses.

In general, predication refers to the use of a predicate function that returns a single true or false value based on a set of one or more parameters. Predication works by using the predicate function, e.g., a non-branch instruction associated with a predicate, to determine whether to change the architectural state (e.g., the execution flow) of the design. A "predicate" may refer to a Boolean value used by an instruction to control whether the instruction is allowed to modify the architectural state of the design or not. If the predicate specified in the instruction is true, for example, the instruction modifies the architectural state of the design. If the predicate specified by the instruction is false, the instruction does not modify the architectural state of the design.

As an illustrative and non-limiting example, a predicated move instruction, e.g., a conditional move, will only modify the destination if the predicate is true. Thus, instead of using a conditional branch to select an instruction or a sequence of instructions to execute based on the predicate that controls whether the branch occurs, the instructions to be executed are associated with that predicate, so that the instructions will be executed, or not executed, based on whether the predicate is true or false.

In accordance with the inventive arrangements described within this disclosure, loop structures in the design may be analyzed. Conventional EDA tools have been unable to analyze loop structures that included predicates, e.g., conditional statements such as "if" statements. A "for" loop structure, because of the possibility that the "for" loop iterates 0 times depending on the loop conditions, is effectively considered an "if" condition by conventional EDA tools. This meant that most conventional EDA tools were limited to inferring burst transfer modes only from particular structures such as "do while" loops and were unable to infer burst transfers from (e.g., unable to process) "for" loop structures or "for" loop structures that included conditional statements.

The inventive arrangements described within this disclosure are capable of analyzing conditional statements within a body portion of a loop structure to determine whether memory accesses in the loop body may be implemented in target hardware using burst transfer mode. In one or more example implementations, a system is capable of analyzing predicate information of a loop structure during HLS. As noted, the predicated memory accesses analyzed during HLS reside within the loop structure itself.

An example structure that may be analyzed in accordance with the inventive arrangements is a loop that includes predicated memory accesses, e.g., such as those conditioned on "if" statements, that are contained in the loop body. The system, for example, analyzes the loop structure to identify sequential access patterns that include the predicated memory accesses. The system is capable of determining, based on the analysis, how the addresses of the predicated memory accesses evolve over the course of loop execution. Based on the analysis, which is performed statically, e.g., during compilation, the system is capable of automatically inferring burst transfers for the resulting circuit design to achieve greater data throughput and performance as implemented in the target hardware. The system is capable of translating the sequential, predicated memory accesses into burst transfers in the resulting circuit design and circuitry generated from the high-level programming language design.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example framework 100 that is executable by an Electronic Design Automation (EDA) system. The EDA system is capable of realizing a user-specified design in hardware. The EDA system may be implemented as a data processing system, e.g., a computer, executing suitable operational software or program code to perform the various operations described within this disclosure. An example of a data processing system that may be used to implement an EDA system and execute framework 100 of FIG. 1 is described in connection with FIG. 10.

In the example of FIG. 1, the EDA system may include an HLS compiler that, when executed, is capable of generating a hardware description language (HDL) version of a design received as source code 102. The HLS compiler may include an HLS compiler front-end 104, an HLS compiler middle-end 108, and an HLS compiler back-end 110. The HLS compiler illustrated in FIG. 1 is capable of inferring, e.g., detecting, memory accesses in the design that may be implemented using a burst transfer mode for read and/or write operations as implemented in the target hardware (e.g., the target IC).

In the example, source code 102 is provided to HLS compiler front-end 104. Source code 102 may be for a user-specified design intended for implementation in an IC. Source code 102 may be specified using a high-level programming language. Examples of high-level programming languages include, but are not limited to, C, C++, Python, and OpenCL.

FIG. 2 illustrates an example of source code 102. In the example, source code 102 includes a for-loop structure. Within the for-loop structure, e.g., at lines 9 and 11, "if" statements are included that determine whether the memory accesses of lines 16, 17, and 18 will execute. The "if" statements are illustrative of statements that include three different types of predicates. These predicates include a range predicate, a loop invariant predicate, and a stride predicate.

A range predicate has the syntax of [induction_variable<comparison operators>loop_invariant_variable]. Referring to line 9, the expression i<=40 is an example of a range predicate as the expression involves the induction variable i, the comparison operator(s) <=, and the loop invariant variable 40. A loop invariant predicate has the syntax [variable<comparison operators>loop_invariant_variable]. Referring to line 9, the expression m>7 is an example of a loop invariant predicate since the variable m is not the induction variable. A stride predicate has the syntax [induction_variable<unsigned modulo>divisor==remainder]. Referring to line 11, the expression i % 2==0 is an example of a stride predicate.

HLS compiler front-end 104 may include a static analyzer and one or more source code analysis tools. HLS compiler front-end 104 is capable of generating an intermediate representation (IR) 106 of source code 102. In one aspect, IR 106 may be specified as an LLVM IR as is used by compilers to represent source code for further processing. IR 106 may be specified as a control flow graph (CFG). FIG. 3 illustrates an example of IR 106 as generated from the example source code 102 of FIG. 2.

In the example, IR 106 is provided to HLS compiler middle-end 108. HLS compiler middle-end 108 is capable of performing burst transfer inference processing 120 on IR 106 as shown in FIG. 1 and as described in greater detail below. The results from HLS compiler middle-end 108, e.g., modified IR 130, are provided to HLS compiler back-end 110.

Burst transfer inference processing 120 can be performed by a basic block analyzer 122, a loop predicate analyzer 124, a sequential access analyzer 126, and a sequential access transformer 128. Burst transfer inference processing 120 generates modified IR 130, which may be provided to HLS compiler back-end 110.

Basic block analyzer 122 is capable of detecting basic blocks within IR 106. The term "basic block" means a list of one or more instructions of IR 106 in execution order that have a single-entry point and a single exit point. The list of the instructions form the body portion of the basic block. In one aspect, the basic blocks may also include one or more memory accesses.

In one aspect, basic block analyzer 122 is capable of forming regions from the basic blocks. In one or more example implementations, basic block analyzer 122 is capable of generating regions by decomposing each function into single entry, single exit basic block fragments. The fragments are combined to form regions such that, for each region, the exit basic block of the region is guaranteed to post dominate the entry basic block of the region; and the entry basic block of the region is guaranteed to dominate the exit basic block of the region. A node "x" is said to dominate node "y" in a directed graph if every path from "start" to "y" includes "x." A node "x" is said to post dominate a node "y" if every path from "y" to the "end" includes "x." The HLS compiler is capable of grouping the plurality of basic blocks into a plurality of regions using the foregoing criteria.

Further aspects of generating regions are described within Pearson et al., "The Program Structure Tree: Computing Control Regions in Linear Time," Proceedings of the ACM SIGPLAN 1994 conference on Programming language design and implementation, Orlando, Florida, USA (Jun. 20-24, 1994), and Vanhatalo et al., "The Refined Process Structure Tree," Data Knowl. Eng. 68 793-818 (2009), both of which are fully incorporated herein by reference. Further aspects of basic block analysis are described in U.S. patent application Ser. No. 17/656,236, filed Mar. 24, 2022, which is fully incorporated herein by reference.

Loop predicate analyzer 124 operates on IR 106 and analyzes the predicates in the loop structure for a given basic block. Loop predicate analyzer 124 determines and returns predicate information under the loop context for a given basic block. The predicate information as determined from lines 9 and 11 of source code 102 controls whether memory accesses in the basic block corresponding to lines 16-18 are executed. Loop predicate analyzer 124, for the enumerated predicate types, is capable of generating predicate information indicating whether memory accesses are executed at runtime with certainty. Loop predicate analyzer 124 is capable of analyzing all supported predicates in the loop body for the given basic block.

FIGS. 4A and 4B, taken collectively and collectively referred to as FIG. 4, illustrate an example of the loop predicate information generated by loop predicate analyzer 124 through analysis of IR 106. As noted, IR 106 is derived from source code 102. The comments which are prepended with ";" in the example of FIG. 4 illustrate the analysis results determined by loop predicate analyzer 124. As shown in FIG. 4, the predicates are listed beneath the statements && predicates, which are located at lines 29, 39, and 55 of FIG. 4.

Sequential access analyzer 126 receives the predicate information such as that illustrated in FIG. 4 as generated by loop predicate analyzer 124. Sequential access analyzer 126 utilizes the predicate information and various SCEV (scalar evolutions) utilities to be described herein in greater detail below to determine whether there are any sequential memory access chains that cross the loop structure. Crossing the loop structure refers to detecting sequential memory accesses that span one iteration of the loop body (e.g., one loop body execution) to another iteration of the loop body (e.g., a next loop body execution). A "sequential memory access chain" refers to two or more memory accesses that are determined to be sequential and that are executed in different iterations of the loop body of the loop construct. Sequential memory accesses are memory accesses that access (e.g., read or write) sequential or contiguous memory.

In response to detecting one or more sequential memory access chains, sequential access analyzer 126 records each such occurrence in a sequential access information object, which is also created by sequential access analyzer 126. Sequential access analyzer 126 is capable of performing this analysis within nested loop structures starting with the inner loop and moving to the outer loop(s). As a sequential memory access chain is detected that extends from an inner loop to an outer loop, sequential access analyzer 126 updates the sequential access information object record to indicate such a condition.

FIGS. 5A and 5B, taken collectively and collectively referred to as FIG. 5, illustrate an example of the sequential access information generated by sequential access analyzer 126. The sequential access information of FIG. 5 corresponds to source code 102. The comments which are prepended with ";" illustrate the analysis results determined by sequential access analyzer 126. In the example of FIG. 5, the statements "sequential access," which are located at lines 33 and 40, illustrate the different sequential memory access chains that are detected. In the example, particular SCEV utilities such as SCEVStep and SCEVAtIteration may be used to determine whether sequential memory accesses cross the loop.

Sequential access transformer 128 operates on the sequential access information object generated by sequential access analyzer 126. Sequential access transformer 128 also accesses target hardware data 132 to transform valid sequential memory access chains specified by the sequential access information object into sequential access intrinsics. Sequential access transformer 128 checks whether there exist any loop invariant predicates for the sequential memory access chain that guard the sequential access chain under correct predicates over the loop. Sequential access transformer 128 is capable of generating modified IR 130.

The phrase "correct predicates over the loop" refers to the loop invariant predicates that guard the analyzed sequential access chain length after sequential access transformer 128 outputs modified IR 130. The sequential access transformer 128 checks whether there are any analyzed loop invariant predicates such as m>7 as previously discussed in connection with FIG. 2, that guard the analyzed sequential memory access chain. Here, the term "guard" or "guarding" means the program code is only executed at runtime when the condition is true. Sequential access transformer 128 generates the sequential access chain having a start address and a length. The length is considered the loop variant predicate, which in this example is the value 29 at line 17 of FIG. 6A. If there are any analyzed loop invariant predicates, sequential access transformer 128 determines that the sequential access length is conditioned by the analyzed loop invariant predicate through a select instruction. Referring to line 17 of FIG. 6A, for example, when the first operand (e.g., the loop invariant predicate %0) is true, the sequential access chain length is 29. When the first operand is false, the sequential access chain length is 0. A length of 0 indicates that there is no sequential access chain at runtime.

FIGS. 6A and 6B, taken collectively and collectively referred to as FIG. 6, illustrate an example of modified IR 130 generated by sequential access transformer 128. Modified IR of FIG. 6 corresponds to source code 102.

In one aspect, HLS compiler middle-end 108 is capable of checking modified IR 130 for legalization. The checking performed by HLS compiler middle-end 108 checks modified IR 130 for burst(s) that conflict on the bundle check prior to conversion of modified IR 130 into HDL 112 by HLS compiler back-end 110. The check performed by HLS compiler middle-end 108 implements a legalization check to determine whether there are same direction (load/store) sequential access chain(s) on the same bundle in the same region. Such accesses are considered illegal. In response to detecting the same direction sequential access chain(s) on the same bundle in the same region, the conflicting sequential accesses may not be lowered to burst accesses. In that case, the legalization check, as performed by HLS compiler middle-end 108, cancels the conflicting sequential accesses and converts the conflicting sequential accesses back to regular load/store accesses.

The term "bundle," in the prior example, refers to a physical port on the target hardware. In general, a single bundle has only a single ReadData first-in-first-out memory (FIFO) and a single WriteData FIFO. The conflicting situation is between two or more sequential access chains (e.g., not with respect to a single sequential access chain). When there are several same direction (all reads or all writes) and independent (e.g., different) sequential access chains in the same region, and those sequential access chains are lowered into bursts, the system is unable to determine the particular sequential access chain to which data in the ReadData FIFO or the WriteData FIFO belongs. This condition can lead to a wrong result.

HLS compiler back-end 110 is capable of translating modified IR 130 from HLS compiler middle-end 108 into HDL 112. In an example, HDL 112 may be specified as a register transfer level (RTL) description. In generating HDL 112, HLS compiler back-end 110 is capable of detecting particular objects (e.g., the intrinsics) within modified IR 130 indicating which memory accesses are to be implemented using burst transfer mode in the resulting HDL 112.

For example, a series of read and/or write memory accesses recognized in source code 102 as being consecutive may be designated for implementation in hardware using the burst transfer mode through burst transfer inference processing 120. Accordingly, in translating the results from the HLS compiler middle-end 108 into HDL 112, the HLS compiler back-end 110 is capable of representing a plurality of memory reads and/or writes (e.g., collectively referred to as "memory accesses") designated for implementation using the burst transfer mode as a single, larger memory read and/or write implemented as a burst transfer.

A burst transfer is a well-known technique to resolve the access data time bottleneck in a design. A burst transfer aggregates sequential (or consecutive) memory accesses and processes the memory accesses without performing all the steps for each memory access to improve performance when communicating with a memory subsystem. A consecutive memory access refers to a plurality of sequentially executed memory accesses where each memory access accesses a next address in the memory such that the plurality of consecutive memory accesses access a continuous region of memory. Further, consecutive memory accesses may not be separated by any side effect instructions when spanning across basic blocks, regions, or loops.

The HDL 112 may be processed through a design flow 114. Design flow 114 may include a synthesis process, a placement process, and a routing process. Design flow 114 may generate a placed and routed circuit design 116. In the example, the placed and routed circuit design 116 may be specified in any of a variety of different formats including, for example, as configuration data or a configuration bitstream, that may be loaded into an IC such as IC 118 thereby physically implementing, e.g., realizing, the design specified by source code 102 in IC 118.

IC 118 may be implemented as any of a variety of different types of ICs including, but not limited to, an Application-Specific IC, a System-on-Chip, a programmable IC (e.g., an IC including at least some programmable circuitry, where programmable logic is a type of programmable circuitry), or the like.

Figure 7:
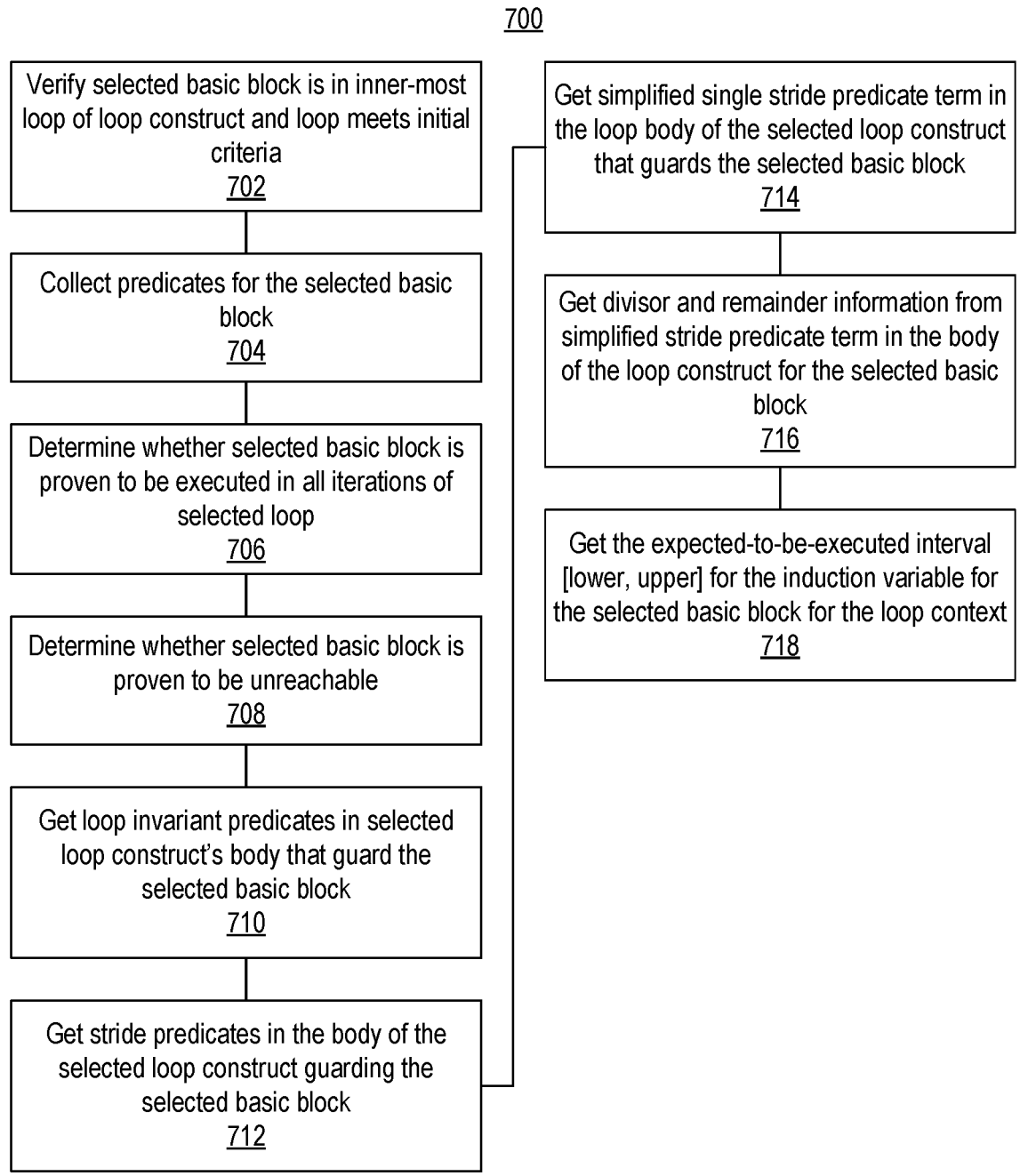
FIG. 7 illustrates an example method for performing loop predicate analysis as performed by the loop predicate analyzer of FIG. 1.

FIG. 7 illustrates an example method 700 for performing loop predicate analysis as performed by loop predicate analyzer 124 of FIG. 1. In general, loop predicate analyzer 124 is capable of detecting and analyzing the three different types of predicates previously mentioned: range predicates, loop invariant predicates, and stride predicates. The example of FIG. 7 illustrates example operations performed by loop predicate analyzer 124 as applied to a selected basic block in the loop construct.

Loop predicate analyzer 124 is capable of generating predicate information that may be queried under the loop context for a selected basic block. The analysis returns a slice that represents the evolution of the induction variable that would happen, with certainty, at runtime for the basic block when the induction variable evolution can be predicted. In one aspect, the result is generated on demand and without transforming IR 106. The loop predicate information generated by loop predicate analyzer 124, e.g., the evolution of the induction variable, is captured with sufficient detail using SCEV analysis representation and one or more SCEV utilities to be described herein in greater detail (e.g., SCEVStep and SCEVAtIteration). The SCEV utilities are used to determine consecutiveness for burst inference.

In general, using SCEV analysis, HLS compiler middle-end 108 is capable of determining how a pointer evolves over time. SCEV is an analysis representation used to determine how a value will evaluate during execution time. There may be multiple equivalent representations for a given value, e.g., a memory address to be read, which makes comparison difficult between different SCEVs. SCEV Canon is a known SCEV technique that may be used in many different types of analysis and optimizations in LLVM including, but not limited to, loop strength reduction, induction variable substitution, and memory access analysis. SCEV Canon is capable of performing canonicalization and further simplification on SCEV representations.

For example, using SCEV Canon, the HLS compiler is capable of checking the equivalence of SCEVs between different SCEV implementations. Thus, using SCEV Canon, the HLS compiler is capable of canonicalizing SCEV representations into the same form to better determine whether any given pair of SCEV representations have an expected difference (e.g., are the same). SCEV Canon may be used to prove that memory accesses are consecutive, e.g., access consecutive memory addresses, in a fragment. In the context of this disclosure, SCEV Canon may be used to determine, at least in part, consecutiveness for memory accesses that span basic blocks, regions, and/or loops.

Turning to FIG. 7, in block 702, loop predicate analyzer 124 verifies that the loop in which the selected basic block is located is the inner-most loop of the loop construct and that the loop meets initial criteria. The initial criteria includes the loop having a preheader, a single backedge (which implies that there is a single latch), a single dedicated exit, and a single loop induction variable.

In block 704, loop predicate analyzer 124 collects predicates for the selected basic block. Loop predicate analyzer 124 may collect predicates as the various operations illustrated in FIG. 7 are executed. Examples of predicate collection are illustrated at lines 29-31 of FIG. 4A and at lines 39-42 and 55-57 of FIG. 4B. In one aspect, loop predicate analyzer 124 may start collection by calculating the iterative post dominance frontiers (IPDFs) of the selected basic block and exclude the IPDF that lives out of the loop or that itself is the loop exiting basic block (e.g., filtered IPDFs).

The dominance frontier of a node dis the set of all nodes $n_i$ such that d dominates an immediate predecessor of $n_i$, but d does not strictly dominate $n_i$. The dominance frontier is the set of nodes where d's dominance stops. When there is more than one IPDF, loop predicate analyzer 124 checks that all the IPDFs dominate the selected basic block, which implies that there is only an "and" relationship between predicates from the CFG paths of the IR. If there are not only "and" relationships from the CFG paths for the selected basic block, loop predicate analyzer 124 reports unknown for the predicate information. Next, loop predicate analyzer 124 collects all the predicates and the true/false edges from the filtered IPDFs. If there are any "or" relationships found inside an IPDF basic block, loop predicate analyzer 124 reports unknown for the predicate information. The true/false edges are analyzed through the dominance relationship between IPDF basic block's successors and the selected basic block.

In block 706, loop predicate analyzer 124 determines whether the selected basic block (see, e.g., lines 18-24 of FIG. 4A and lines 60-65 of FIG. 4B) is proven to be executed in all iterations of the selected loop construct. For example, loop predicate analyzer 124 may prove that the selected basic block is executed in all iterations of the selected loop construct using the dominance relationship between the selected basic block and the unique exit basic block of the loop. If the selected basic block dominates the exit basic block of the loop, the selected basic block is executed in all iterations of the loop.

In block 708, loop predicate analyzer 124 determines whether the selected basic block is proven to be unreachable. In one aspect, loop predicate analyzer 124 proves the selected basic block to be unreachable in response to finding any opposite polarity.

In block 710, loop predicate analyzer 124 gets the loop invariant predicates in the body of the selected loop construct that guard the selected basic block. Examples of loop invariant predicates obtained in block 710 are illustrated at line 31 of FIG. 4A and at line 42 of FIG. 4B. Loop invariant predicates may be determined based on the existing proof of the LLVM existing loop and collected into a set.

In block 712, loop predicate analyzer 124 gets the stride predicates in the body of the selected loop construct that guard the selected basic block. Loop predicate analyzer 124 is capable of recognizing the stride predicate and collecting the stride predicate into a set.

In block 714, loop predicate analyzer 124 gets the simplified single stride predicate term in the loop body of the selected loop construct that guards the selected basic block. For example, loop predicate analyzer 124 is capable of returning nulls when there is no stride predicate or more than one stride predicate. Loop predicate analyzer 124 is capable of simplifying the stride predicate using the Chinese Remainder Theorem.

In block 716, loop predicate analyzer 124 gets the divisor and remainder information from the simplified stride predicate term in the body of the loop construct for the selected basic block. For example, loop predicate analyzer 124 extracts the divisor and the remainder part from the simplified single stride predicate. As noted, the simplified stride predicate may be simplified using the Chinese Remainder Theorem.

In block 718, loop predicate analyzer 124 gets the expected-to-be-executed interval [Lower, Upper) for the induction variable for the selected basic block for the loop context (see, e.g., lines 20 and 28 of FIG. 4A and lines 38, 54, and 62 of FIG. 4B). For example, loop predicate analyzer 124 is capable of determining how the induction variable evolves over the loop for the selected basic block based on the understanding of range and stride predicates. The result may be given as a single interval on the induction variable. If there are several intervals existing over the loop for the selected basic block, the loop predicate analysis reports unknown. When loop predicate analyzer 124 determines that there is a loop variant predicate that is not a range or a stride predicate, loop predicate analyzer 124 reports unknown for the induction variable evolution interval.

In one or more example implementations, block 718 may be implemented so that loop predicate analyzer 124 returns the induction variable evolution interval: [Lower, Upper) which includes the Lower value but excludes the Upper value. In cases where the Lower value is proved to be greater than or equal to the Upper value, the induction evolution interval is considered to be an empty interval.

In some aspects, block 718 may be performed as follows.

Loop predicate analyzer 124 calculates an initial interval from the loop context. Loop predicate analyzer 124 obtains the affine representation from the LLVM SCEV for the induction variable: {base, +, stride}. Loop predicate analyzer 124 further calculates the loop trip count based on LLVM SCEV support. Further, loop predicate analyzer 124 calculates the initial interval as (base, stride×loop trip count+base).

Next, as part of implementing block 718, loop predicate analyzer 124 updates the interval for each range predicate that has a non-equality comparison operator or==operator by getting the maximum value for the Lower value and getting the minimum value for the Upper value. For the range predicate that has the !=operator (e.g., induction variable !=v), loop predicate analyzer 124 checks that either v is equivalent to the Lower value or v+1 is equivalent to the Upper value for updating the interval into [v+1, Upper) or [Lower,v). Other than these particular conditions, loop predicate analyzer 124 conservatively returns unknown.

Next, as part of implementing block 718, loop predicate analyzer 124 aligns the Lower value to the first value that is greater than or equal to the Lower value and that is on the induction variable affine(L'). L' is calculated as (steps× stride+base), where steps is [ceiling((Lower−base)/stride)].

Next, as part of implementing block 718, loop predicate analyzer 124 is capable of updating the interval for the simplified single stride predicate with first computing the affine: {modulo_base, +, modulo_stride}. The modulo_base is calculated as ceiling(max(L'−remainder, 0)/divisor)*divisor+remainder, where the remainder and the divisor are constants. Loop predicate analyzer 124 calculates the modulo_stride as the least common multiple of the divisor and the stride where the divisor and the stride are constants.

Further, loop predicate analyzer 124 checks whether the given basic block guarded by the simplified stride predicate would be executed over the selected loop through proving the intersection of the simplified single stride predicate affine and the induction affine. Since the intersection of two affines would be either affine or null, the intersection of the two affines may be checked based on whether the induction variable affine can step on the calculated modulo_base. The loop predicate analysis further calculates the number of steps on the induction variable steps on the modulo_base. Lastly, the Lower value is updated as the (number_of_steps× stride+base), where all values are constants(L^).

FIG. 8 illustrates an example method 800 for performing sequential access analysis as performed by sequential access analyzer 126 of FIG. 1. Sequential access analyzer 126 is capable of using the loop predicate analysis data to detect sequential access patterns for predicated accesses in loop bodies. For each loop, sequential access analyzer 126 analyzes the sequential access pattern in the loop body. Then, sequential access analyzer 126 determines whether the detected sequential accesses in the loop body can be extended to longer sequential accesses spanning over the entire loop. Sequential access analyzer 126 implements the analysis from the inner most loop to the outer most loop. Method 800 illustrates example operations executed by sequential access analyzer 126 in performing the sequential access analysis.

In block 802, sequential access analyzer 126 is capable of collecting memory accesses in the loop and in the child loop(s) of the loop that are not in a detected sequential access chain or the first memory access of the detected sequential access chains into load/store candidate lists (see, e.g., lines 37 and 44 of FIG. 5A). In addition, sequential access analyzer 126 is capable of collecting all instructions in the loop that may access the memory into may-load/may-store candidate lists.

In block 804, for each memory access in the candidate lists (e.g., both the load/store candidate lists and the may-load/store candidate lists), sequential access analyzer 126 is capable of using the loop predicate analysis data to check if the access is under supported predicates. The supported scenarios for the basic block in which the memory access lives include:

- the memory access is not proved to be unreachable;
- the memory access is executed in every iteration of the loop;
- the memory access is guarded by loop invariant predicates in the loop;
- the memory access is guarded by at most one simplified stride predicate in the loop; and
- the memory access is guarded by range/stride predicates in the loop having single induction variable, and the sequential analysis succeeds in getting the expected-to-be-executed interval: [Lower, Upper) on the induction variable for the basic block from the loop predicate analysis.

In block 806, sequential access analyzer 126 determines the consecutiveness of the candidate access over the loop. In one aspect, sequential access analyzer 126 performs the check by analyzing how the access address evolves over the loop and checking whether the access address stride over the loop is the same as the total element size that is accessed in the loop. Sequential access analyzer 126 compares the access addresses over the loop with the access address stride over the loop to determine whether the two are the same. The two being the same indicates that the candidate accesses are consecutive over the loop.

In one or more example implementations, block 806 may be implemented using a function called SCEVStep. Listing 1 illustrates example pseudo code for the SCEVStep function. The function SCEVStep operates recursively. An SCEV expression is a tree structure. SCEVStep visits the SCEV expression from the tree root to the leaves. SCEVStep builds the final answer back from the leaves to the root as illustrated in connection with the example pseudo code of Listing 1. The pseudo code of Listing 1 illustrates that the SCEVStep function takes a loop and two SCEVs: S, Itr as input. The SCEVStep function computes the generic SCEV of S after stepping through Itr iterations of the loop. SCEVStep is performed using the rules below in Listing 1 for each kind of SCEV expression recursively.

Listing 1

SCEVConstant: Step(S)=S
SCEVTruncateExpr: Step(S=trunc(Op))=trunc(Step(Op))
SCEVZeroExtendExpr: Step(S=zext(Op))=zext(Step (Op))
SCEVSignExtendExpr: Step(S=Sext(Op))=sext(Step (Op))
SCEVAddExpr: Step(S=Op0+Op1+ . . . +OpN)=Step (Op0)+Step(Op1)+ . . . +Step(OpN)
SCEVMulExpr: Step(S=Op0×Op1× . . . ×OpN)=Step (Op0)×Step(Op1)× . . . ×Step(OpN)
SCEVUDivExpr: Step(S=LHS/u RHS)=Step(LHS)/u Step(RHS)
SCEVAddRecExpr: S={Op0, +, Op1, +, Op2, . . . , +, OpN}<L>, where the base is Op0, the step is {Op1, +, Op2, +, . . . , +, OpN}, and the associated loop is L.
When the loop L is the same as the given loop, the generic SCEV of the given recurrence S after stepping through Itr iterations of the given loop is computed by multiplying each element in each contained addrec recurrence by the binomial coefficient corresponding to the recurrence. For example, the {Op0, +, Op1, +, Op2} after stepping through Itr iterations of the given loop is calculated as {(Op0×BC(Itr, 0)+Op1×BC(Itr, 1)+Op2×BC(Itr, 2)), +, (Op1×BC(Itr, 0)+Op2×BC(Itr, 1)), +, Op2}, where BC(Itr, k) stands for binomial coefficient. When the loop L is different from the given loop, Step(S={Op0, +,Op1, +,Op2, +, . . . , +, OpN})={Step (Op0), +, Step(Op1),+, Step(Op2), +, . . . , +, Step (OpN)).
SCEVSMaxExpr: Step(S=smax(Op0, Op1, . . . , OpN))= smax(Step(Op0), Step(Op1), . . . , Step(OpN))
SCEVUMaxExpr: Step(S=umax(Op0, Op1, . . . , OpN))= umax(Step(Op0), Step(Op1), . . . , Step(OpN))
SCEVUnknown: Step(S)=S is loop invariant ? S: SCEV-CouldNotCompute
SCEVCouldNotCompute: Step(S)=SCEVCouldNotCompute
With the generic SCEV of S after stepping through Itr iterations of the loop, the distance between any Itr iterations of a loop for S can be analyzed through simple subtraction.

In one or more example implementations, for the simplified single stride predicate term (e.g., [induction variable<unsigned modulo>divisor==remainder]), sequential access analyzer 126 gets the SCEV(E) of the access address at any iteration and the affine SCEV of the induction variable (e.g., {base, +, stride}). Sequential access analyzer 126 calculates the intersection step as: [(the least common multiple of the divisor and the stride)/stride], where the divisor and the stride are constants. Sequential access analyzer 126 uses the function SCEVStep to step through the intersection step on E and get the next step SCEV(E'). Sequential access analyzer 126 further calculates the access address stride over the loop as E'-E.

In other situations, sequential access analyzer 126 gets the affine SCEV (e.g., {addr_base, +, addr_stride}) of the access address at any iteration K. The address stride over the loop is addr_stride. After getting the address stride, sequential access analyzer 126, for any candidate access, checks if [access_element_size*detected_sequential_access_length] is equivalent to the address stride. The detected_sequential_access_length is 1 if the candidate access is not yet in any detected sequential access chain.

In block 808, sequential access analyzer 126 checks whether there are any side effect instructions that are within the loop that could block the burst transformation correctness. A side effect instruction is an instruction that modifies some state variable value(s) outside of the local environment of the instruction. In this case, sequential analyzer 126 checks for any aliasing side effect instruction(s). When a side effect instruction is aliasing with the pointers, sequential access analyzer 126 discontinues inferencing (e.g., detecting) the sequential access chain since the side effect instruction and the pointer effect the same memory location. The sequential access chain is not permitted to cross the aliasing side effect instructions. For purposes of illustration, consider the example of Listing 2 below.

Listing 2

```
define void @foo([1024 x i16]* noalias nonnull %a) {
entry:
    %aarrayidx0 = getelementptr inbounds [1024 x i16], [1024 x i16]* %a,
    i32 0, i64 0
    %a0 = load i16, i16* %aarrayidx0, align 64
    call void @test(i16* %aarrayidx0)
    %aadd.ptr = getelementptr inbounds [1024 x i16], [1024 x i16]* %a,
    i32 0, i64 1
    %a1 = load i16, i16* %aadd.ptr, align 64
    ret void
}
```

Since the pointer passed to the test function is aliased to the pointer "a" that is used with the sequential access pattern, where the first load instruction loads a[0] and the second load instruction loads a[1], there could be pointer arithmetic operations and load/store performed on the pointer inside the test function. In this scenario, such operations on the pointer can lead to an error in the case where a length 2 burst inference is performed on "a".

In block 810, sequential access analyzer 126 determines whether the detected consecutive access length is greater than 1. In block 812, in response to determining that the detected consecutive access length from block 806 is greater than 1, sequential access analyzer 126 records the sequential access chain information by creating a sequential access object or updating the sequential access object with the certain information regarding the analysis performed (see, e.g., lines 33-36 of FIG. 5A and lines 40-43 of FIG. 5B). For example, sequential access analyzer 126 updates the sequential access chain information with the following information: underlying object, access direction, start access address, access length, access element type, list of the accesses detected in this sequential access chain, and the loop invariant predicates that guard the access. Sequential access analyzer 126 also records into the sequential access information object the sequential access object and the particular region in which this sequential access object lives.

In one or more example implementations, block 812 may be implemented using a function called SCEVAtIteration. Listing 3 illustrates example pseudo code for the SCEVAtIteration function. The function SCEVAtIteration, like the function SCEVStep, operates recursively. SCEVAtIteration visits the SCEV expression from the tree root to the leaves. SCEVAtIteration builds the final answer back from the leaves to the root as described in greater detail below with reference to the example pseudo code of Listing 3. In general, the pseudo code of Listing 3 illustrates that the SCEVAtIteration function takes a loop and two SCEVs: S, Itr as input. The SCEVAtIteration function computes the specific SCEV of S at the specific iteration Itr of the loop.

SCEVAlteration is performed using the rules below in Listing 3 for each kind of SCEV expression recursively.

Listing 3

SCEVConstant: EvaluateAtItr(S)=S
SCEVTruncateExpr: EvaluateAtItr(S=trunc(Op))=trunc(EvaluateAtItr(Op))
SCEVZeroExtendExpr: EvaluateAtItr(S=zext(Op))=zext(EvaluateAtItr(Op))
SCEVSignExtendExpr: EvaluateAtItr(S=Sext(Op))=sext(EvaluateAtItr(Op))
SCEVAddExpr: EvaluateAtItr(S=Op0+Op1+ . . . +OpN)= EvaluateAtItr(Op0)+EvaluateAtItr(Op1)+ . . . +EvaluateAtItr(OpN)
SCEVMulExpr: EvaluateAtItr(S=Op0×Op1× . . . ×OpN)= EvaluateAtItr(Op0)×EvaluateAtItr(Op1)× . . . ×EvaluateAtItr(OpN)
SCEVUDivExpr: EvaluateAtItr(S=LHS/u RHS)=EvaluateAtItr(LHS)/u EvaluateAtItr(RHS)
SCEVAddRecExpr: S={Op0, +, Op1, +, Op2, . . . , +, OpN}<L>
When the loop L is the same as the given loop, the specific SCEV of the given recurrence S at the specific iteration Itr of the given loop is computed by multiplying each element in the addrec recurrence by the binomial coefficient corresponding to the recurrence. For example, the {Op0, +, Op1, +, Op2} at iteration Itr of the given loop is calculated as Op0×BC(Itr, 0)+Op1×BC(Itr, 1)+Op2×BC(Itr, 2).
When the loop L is different from the given loop, EvaluateAtItr(S={Op0, +, Op1, +, Op2, +, . . . , +, OpN})= {EvaluateAtItr(Op0), +, EvaluateAtItr(Op1), +, EvaluateAtItr(Op2), +, . . . , +, EvaluateAtItr(OpN)}.
SCEVSMaxExpr: EvaluateAtItr(S=smax(Op0, Op1, . . . , OpN))=smax(EvaluateAtItr(Op0), EvaluateAtItr(Op1), . . . , EvaluateAtItr(OpN))
SCEVUMaxExpr: EvaluateAtItr(S=umax(Op0, Op1, . . . , OpN))=umax(EvaluateAtItr(Op0), EvaluateAtItr(Op1), . . . , EvaluateAtItr(OpN))
SCEVUnknown: EvaluateAtItr(S)=S is loop invariant ? S: SCEVCouldNotCompute
SCEVCouldNotCompute: EvaluateAtItr(S)=SCEVCouldNotCompute A sequential access object records information about a single sequential access chain. For example, a sequential access object records the direction of the sequential access chain, the start address of the sequential access chain, the length of the sequential access chain, and the individual accesses that compose the sequential access chain. A sequential access information object collects all sequential accesses objects in a function. As such, there exists only one sequential access information object per function.

Sequential access analyzer 126 is capable of calculating the start access address of the sequential access chain by performing the following operations.

For accesses executed in all iterations or that are only guarded by loop invariant predicates, the start access address of the sequential access chain is the addr_base of the LLVM SCEV provided address affine SCEV: {addr_base,+, addr_stride}.

For accesses under supported predicates (e.g., the three types of predicates described herein):
first determine from the loop predicates analysis the number of steps the induction variable would enter the expected-to-be-executed interval: [Lower, Upper).

Next calculate the information as ceiling ((Lower−base)/stride), where the induction variable affine is {base, +, stride}.

Next use SCEVAtIteration to get the access address SCEV at the computed number of steps.

Sequential access analyzer 126 is capable of calculating the length of the sequential access chain by performing the following operations.

For accesses executed in all iterations or that are only guarded by loop invariant predicates, the length of the sequential access chain is the loop trip count.

For accesses under supported predicates (e.g., the three types of predicates described herein):
First determine whether the loop predicate analysis analyzed interval: [Lower, Upper) is empty by using the expression: (Upper minus Lower) is known to be non-positive.

In response to determining that the interval is not empty, determine from the loop predicate analysis the induction stride over the loop for the basic block in which the memory access lives. The induction stride is the stride of the induction variable affine when there is not any stride predicate guarding the memory access execution.

When there is a stride predicate guarding the memory access execution, the induction stride is the modulo_stride from the loop predicate analysis computed affine for the single simplified stride predicate: {modulo_base, +, modulo_stride}. The final sequential access length is calculated as [ceiling(max((Upper−Lower), 0)/induction_stride)×detected_sequential_access_length]. It should be appreciated that detected_sequential_access_length is 1 if the candidate access is not yet in any detected sequential access chain.

When (Upper minus Lower) is proved to be equivalent to induction_stride, there is nothing to extend over the loop.

FIG. 9 illustrates an example method 900 for performing sequential access transformation as performed by sequential access transformer 128 of FIG. 1. In general, sequential access transformer 128 performs operations that, based on the results obtained from the sequential access analysis performed by sequential access analyzer 126, generates burst transfer intrinsics for predicated sequential accesses over the loop.

In block 902, sequential access transformer 128 obtains sequential access information from sequential access analyzer 126.

In block 904, sequential access transformer 128 determines whether each sequential access chain is associated with an interface of the target hardware that supports burst transfer optimizations. For example, sequential access transformer 128 visits each sequential access chain recorded in the sequential access information object. For each sequential access chain, sequential access transformer 128 checks whether the recorded underlying object of the sequential access chain is on an interface of the target hardware that supports specific optimizations on the sequential access pattern. As an illustrative and non-limiting example, a memory mapped Advanced Microcontroller Bus Architecture extensible Interface (AXI) interface supports burst transfer mode.

In block 906, sequential access transformer 128 transforms the sequential access pattern of the IR 106 to generate modified IR 130 including burst transfer intrinsics (see, e.g., FIGS. 6A and 6B). For the sequential access chain recorded to be lived over a loop, sequential access transformer 128 is capable of performing the operations described below. In one or more example implementations, the code generation operations described below may be performed using the LLVM SCEVExpander function from SCEVs. LLVM SCEVExpander is a code generator that is capable of generating LLVM IR code from a given SCEV.

First, get the access direction, the start access address in SCEV (e.g., %start_address), the access length in SCEV, and the loop invariant predicates that guard the access of the sequential access chain from the sequential access information object.

In the case where there are no loop invariant predicates for the sequential access chain, the access length is simply the recorded access length.

If there is more than one loop invariant predicate, an "and" instruction is created for all loop invariant predicates. Further, a length variable (%length) is generated to represent the length of the sequential access. The length variable is a selection instruction that selects between the recorded access length when all loop invariant predicates are true and zero for the opposite case.

Further, a %tok=fpga.seq.{load/store}.begin(%start_address, %length) instruction is generated in the loop preheader basic block to mark the beginning or start of the sequential access chain.

Next, the list of accesses detected in this sequential access chain and the access element type of the sequential access chain is obtained from the sequential access information object.

For each access in the list, the offset from the start of the sequential access chain with ((the access address SCEV—the start access address of the sequential access chain)/the access element type's size (in bytes)) is calculated.

If the sequential access chain is on a load direction, all memory access uses are replaced with %v=fpga.seq.load(%tok, %offset).

If the sequential access chain is on a store direction, fpga.seq.store(%tok, %offset, %byte_enable_mask) is generated.

Lastly, generate the fpga.seq.{load/store}.end(%tok, %length) in the loop exit basic block to mark the end of the sequential access chain.

Figure 10:
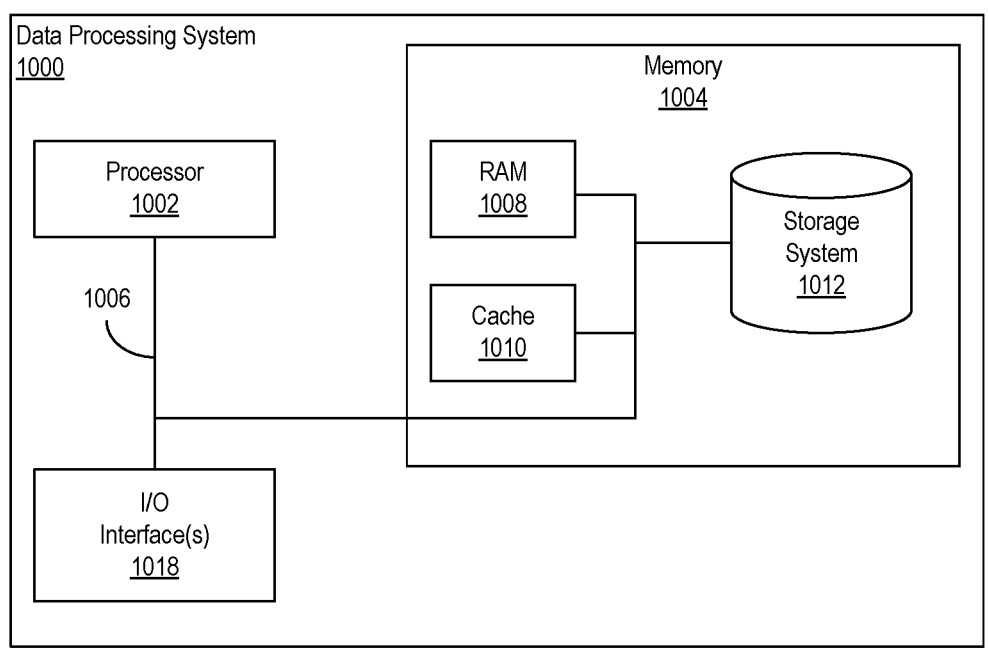
FIG. 10 illustrates an example of a data processing system for use with the inventive arrangements described within this disclosure.

FIG. 10 illustrates an example implementation of a data processing system 1000. As defined herein, the term "data processing system" means one or more hardware systems configured to process data, each hardware system including at least one processor and memory, wherein the processor is programmed with computer-readable instructions that, upon execution, initiate operations. Data processing system 1000 can include a processor 1002, a memory 1004, and a bus 1006 that couples various system components including memory 1004 to processor 1002.

Processor 1002 may be implemented as one or more hardware processors. In an example, processor 1002 is implemented as a central processing unit (CPU). Processor 1002 may be implemented as one or more circuits capable of carrying out instructions contained in program code. The circuit may be an integrated circuit or embedded in an integrated circuit. Processor 1002 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1006 represents one or more of any of a variety of communication bus structures. By way of example, and not limitation, bus 1006 may be implemented as a Peripheral Component Interconnect Express (PCIe) bus. Data processing system 1000 typically includes a variety of computer system readable media. Such media may include computer-readable volatile and non-volatile media and computer-readable removable and non-removable media.

Memory 1004 can include computer-readable media in the form of volatile memory, such as random-access memory (RAM) 1008 and/or cache memory 1010. Data processing system 1000 also can include other removable/non-removable, volatile/non-volatile computer storage media. By way of example, storage system 1012 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1006 by one or more data media interfaces. Memory 1004 is an example of at least one computer program product.

Memory 1004 is capable of storing computer-readable program instructions that are executable by processor 1002. For example, the computer-readable program instructions can include an operating system, one or more application programs, other program code, and program data. The computer-readable program instructions may include an HLS compiler that, when executed, is capable of performing the various operations described herein and/or one or more EDA tools that, when executed, is/are capable of performing a design flow on a circuit design as described herein.

Accordingly, processor 1002, in executing the computer-readable program instructions, is capable of performing the various operations described herein that are attributable to a computer. It should be appreciated that data items used, generated, and/or operated upon by data processing system 1000 are functional data structures that impart functionality when employed by data processing system 1000. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1000 may include one or more Input/Output (I/O) interfaces 1018 communicatively linked to bus 1006. I/O interface(s) 1018 allow data processing system 1000 to communicate with one or more external devices and/or communicate over one or more networks such as a local area network (LAN), a wide area network (WAN), and/or a public network (e.g., the Internet). Examples of I/O interfaces 1018 may include, but are not limited to, network cards, modems, network adapters, hardware controllers, etc. Examples of external devices also may include devices that allow a user to interact with data processing system 1000 (e.g., a display, a keyboard, and/or a pointing device) and/or other devices such as accelerator card.

Data processing system 1000 is only one example implementation. Data processing system 1000 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 10 is not intended to suggest any limitation as to the scope of use or functionality of example implementations described herein. Data processing system 1000 is an example of computer hardware that is capable of performing the various operations described within this disclosure. In this regard, data processing system 1000 may include fewer components than shown or additional components not illustrated in FIG. 10 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one hardware processor programmed to initiate operations and memory.

As defined herein, "execute" and "run" comprise a series of actions or events performed by the processor in accordance with one or more machine-readable instructions. "Running" and "executing," as defined herein refer to the active performing of actions or events by the processor. The terms run, running, execute, and executing are used synonymously herein.

As defined herein, the term "hardware processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "individual" and "user" each refer to a human being.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "real-time" means a level of processing responsiveness that a user or system senses as sufficiently immediate for a particular process or determination to be made, or that enables the processor to keep up with some external process.

As defined herein, the term "soft" in reference to a circuit means that the circuit is implemented in programmable logic or programmable circuitry. Thus, a "soft processor" means at least one circuit implemented in programmable circuitry that is capable of carrying out instructions embodied as program instructions.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc., may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
generating, using computer hardware, an intermediate representation of a design specified in a high-level programming language, wherein the design is for an integrated circuit;
using the computer hardware, determining loop predicate information for one or more conditional statements within a loop body of the intermediate representation;
determining, using the computer hardware, that a plurality of memory accesses of the loop body guarded by the one or more conditional statements are sequential memory accesses that execute in different iterations of the loop body based on the predicate information; and
modifying the intermediate representation by inserting one or more intrinsics therein indicating that the sequential memory accesses are to be implemented using a burst transfer mode of the integrated circuit.

2. The method of claim 1, further comprising:
detecting basic blocks within the intermediate representation.

3. The method of claim 1, further comprising:
generating a hardware description language version of the design from the intermediate representation, as modified, wherein the sequential memory accesses are designated for implementation in the integrated circuit using the burst transfer mode.

4. The method of claim 1, wherein the one or more conditional statements include a loop invariant predicate.

5. The method of claim 1, wherein the one or more conditional statements include a range predicate.

6. The method of claim 1, wherein the one or more conditional statements include a stride predicate.

7. The method of claim 1, further comprising:
generating sequential access chain information specifying a plurality of sequential memory accesses supported by selected predicate types, wherein the sequential access chain information includes a start access address, an access length, a list of the sequential memory accesses, and one or more predicates of the selected predicate types that guard the sequential memory accesses.

8. A system, comprising:
one or more hardware processors configured to initiate operations including:
generating an intermediate representation of a design specified in a high-level programming language, wherein the design is for an integrated circuit;
determining loop predicate information for one or more conditional statements within a loop body of the intermediate representation;
determining that a plurality of memory accesses of the loop body guarded by the one or more conditional statements are sequential memory accesses that execute in different iterations of the loop body based on the predicate information; and
modifying the intermediate representation by inserting one or more intrinsics therein indicating that the sequential memory accesses are to be implemented using a burst transfer mode of the integrated circuit.

9. The system of claim 8, wherein the one or more processors are configured to initiate operations further comprising:
detecting basic blocks within the intermediate representation.

10. The system of claim 8, wherein the one or more processors are configured to initiate operations further comprising:
generating a hardware description language version of the design from the intermediate representation, as modified, wherein the sequential memory accesses are designated for implementation in the integrated circuit using the burst transfer mode.

11. The system of claim 8, wherein the one or more conditional statements include a loop invariant predicate.

12. The system of claim 8, wherein the one or more conditional statements include a range predicate.

13. The system of claim 8, wherein the one or more conditional statements include a stride predicate.

14. The system of claim 8, wherein the one or more processors are configured to initiate operations further comprising:
generating sequential access chain information specifying a plurality of sequential memory accesses supported by selected predicate types, wherein the sequential access chain information includes a start access address, an access length, a list of the sequential memory accesses, and one or more predicates of the selected predicate types that guard the sequential memory accesses.

15. A computer program product comprising one or more computer readable storage mediums having program instructions embodied therewith, the program instructions executable by computer hardware to cause the computer hardware to initiate executable operations comprising:
generating an intermediate representation of a design specified in a high-level programming language, wherein the design is for an integrated circuit;
determining loop predicate information for one or more conditional statements within a loop body of the intermediate representation;
determining that a plurality of memory accesses of the loop body guarded by the one or more conditional statements are sequential memory accesses that execute in different iterations of the loop body based on the predicate information; and
modifying the intermediate representation by inserting one or more intrinsics therein indicating that the sequential memory accesses are to be implemented using a burst transfer mode of the integrated circuit.

16. The computer program product of claim 15, wherein the program instructions are executable by the computer hardware to initiate operations further comprising:
generating a hardware description language version of the design from the intermediate representation, as modified, wherein the sequential memory accesses are designated for implementation in the integrated circuit using the burst transfer mode.

17. The computer program product of claim 15, wherein the one or more conditional statements include a loop invariant predicate.

18. The computer program product of claim 15, wherein the one or more conditional statements include a range predicate.

19. The computer program product of claim 15, wherein the one or more conditional statements include a stride predicate.

20. The computer program product of claim 15, wherein the program instructions are executable by the computer hardware to initiate operations further comprising:
   generating sequential access chain information specifying a plurality of sequential memory accesses supported by selected predicate types, wherein the sequential access chain information includes a start access address, an access length, a list of the sequential memory accesses, and one or more predicates of the selected predicate types that guard the sequential memory accesses.

\* \* \* \* \*